(12) United States Patent
Amemiya

(10) Patent No.: US 8,848,482 B2
(45) Date of Patent: Sep. 30, 2014

(54) ULTRASOUND PROBE AND ULTRASOUND DIAGNOSTIC APPARATUS

(75) Inventor: Shinichi Amemiya, Tokyo (JP)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 376 days.

(21) Appl. No.: 13/311,784

(22) Filed: Dec. 6, 2011

(65) Prior Publication Data

US 2012/0140595 A1 Jun. 7, 2012

(30) Foreign Application Priority Data

Dec. 7, 2010 (JP) ................................. 2010-272123

(51) Int. Cl.
*G01S 15/02* (2006.01)
*H05K 13/00* (2006.01)
*G01S 15/89* (2006.01)

(52) U.S. Cl.
CPC .................. *G01S 15/8927* (2013.01)
USPC ......................................................... 367/11

(58) Field of Classification Search
CPC .................................................. G01S 15/8927
USPC ...................................................... 367/7, 11
See application file for complete search history.

(56) References Cited

U.S. PATENT DOCUMENTS

| | | | |
|---|---|---|---|
| 6,868,729 | B2 | 3/2005 | Amemiya |
| 7,111,515 | B2 | 9/2006 | Amemiya |
| 2005/0124891 | A1 | 6/2005 | Amemiya |
| 2005/0203412 | A1 | 9/2005 | Amemiya |
| 2009/0028211 | A1 | 1/2009 | Amemiya |
| 2012/0140595 | A1* | 6/2012 | Amemiya ....................... 367/87 |

FOREIGN PATENT DOCUMENTS

| | | | | |
|---|---|---|---|---|
| CN | 102658262 A | * | 9/2012 | .......... G01S 15/8927 |
| JP | 54062684 | | 5/1979 | |
| JP | 5925462 | | 2/1984 | |
| JP | 01126952 | | 5/1989 | |
| JP | 2002291741 | | 10/2002 | |
| JP | 2003290228 | | 10/2003 | |
| JP | 2004057460 | | 2/2004 | |
| JP | 2005278918 | | 10/2005 | |
| JP | 2007029268 | | 2/2007 | |
| KR | 20120063449 A | * | 6/2012 | .......... G01S 15/8927 |

OTHER PUBLICATIONS

Japanese Notice of Rejection, Application No. 2010-272123, dated Nov. 6, 2012, pp. 6.

* cited by examiner

*Primary Examiner* — Daniel Pihulic
(74) *Attorney, Agent, or Firm* — Armstrong Teasdale LLP

(57) ABSTRACT

An ultrasound probe connected to an ultrasound diagnostic apparatus configured to transmit an ultrasound beam to a target object is provided. The ultrasound probe includes a switching unit including N/2 channels, each channel configured to switch between a first pole and a second pole, wherein N is a natural number, N/2 first transducer elements connected to the first pole and placed in two-dimensions, wherein a placement is defined in an x-axis direction and a y-axis direction, and N/2 second transducer elements connected to the second pole and placed in two-dimensions, wherein the placement is defined in the x-axis and y-axis directions, wherein a placement of a channel number of the first transducer elements and a placement of a channel number of the second transducer elements differ in the x-axis and y-axis directions.

20 Claims, 16 Drawing Sheets

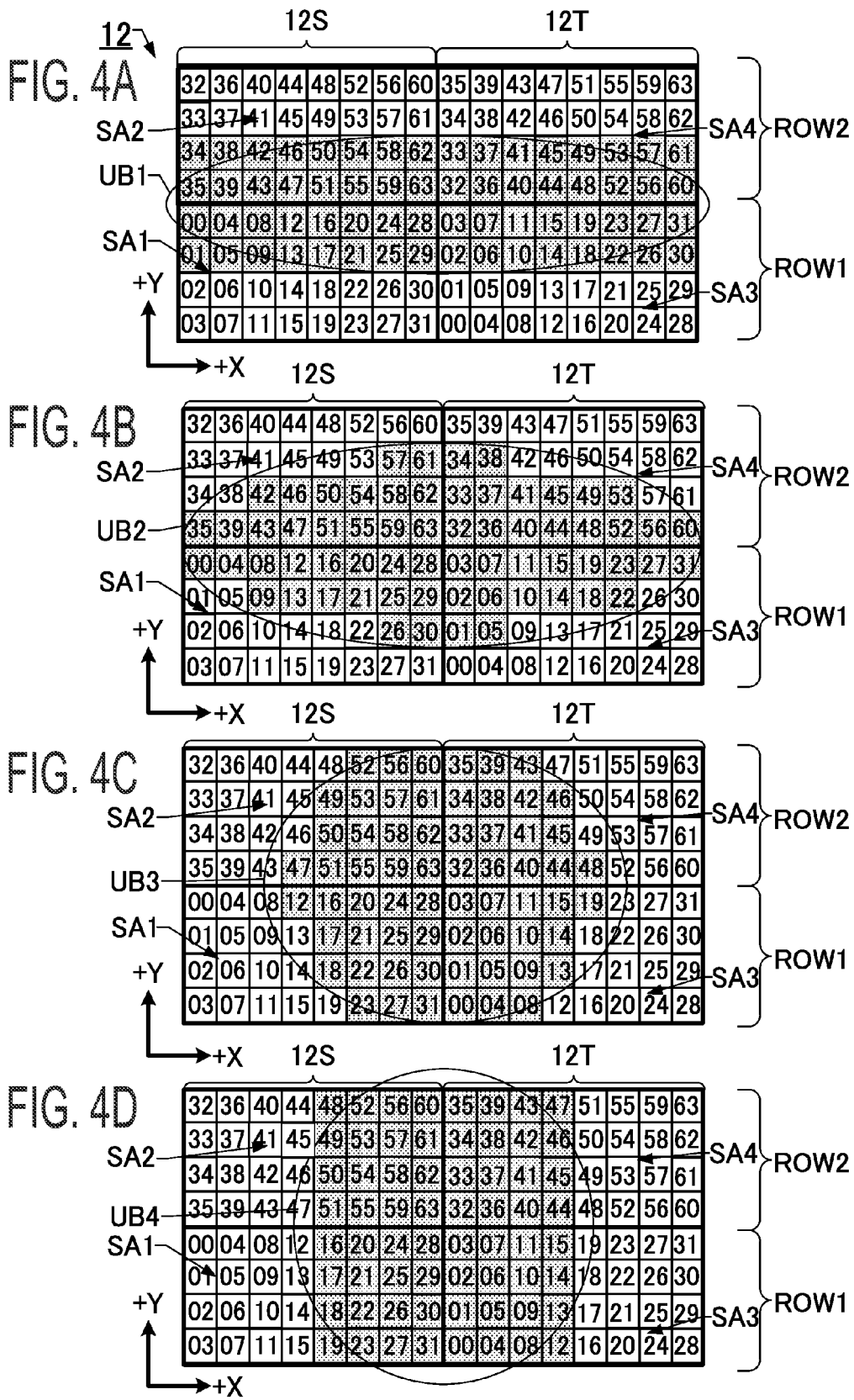

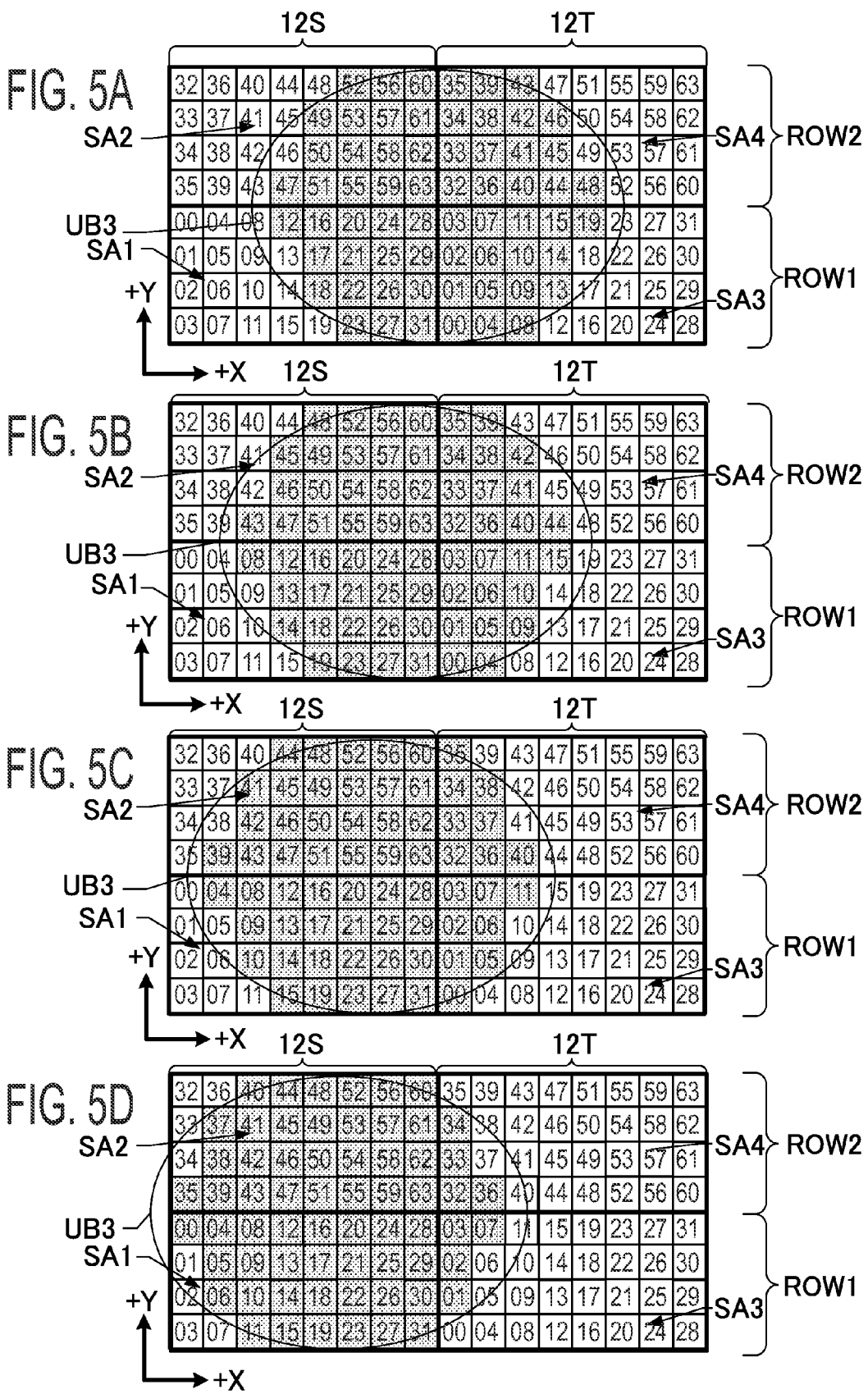

FIG. 6

|  | 12S |  |  |  |  |  |  | 12T |  |  |  |  |  |  |  |
|---|---|---|---|---|---|---|---|---|---|---|---|---|---|---|---|
| 00 | 01 | 02 | 03 | 16 | 17 | 18 | 19 | 12 | 13 | 14 | 15 | 28 | 29 | 30 | 31 |
| 04 | 05 | 06 | 07 | 20 | 21 | 22 | 23 | 08 | 09 | 10 | 11 | 24 | 25 | 26 | 27 |
| 08 | 09 | 10 | 11 | 24 | 25 | 26 | 27 | 04 | 05 | 06 | 07 | 20 | 21 | 22 | 23 |
| 12 | 13 | 14 | 15 | 28 | 29 | 30 | 31 | 00 | 01 | 02 | 03 | 16 | 17 | 18 | 19 |
| 32 | 33 | 34 | 35 | 48 | 49 | 50 | 51 | 44 | 45 | 46 | 47 | 60 | 61 | 62 | 63 |
| 36 | 37 | 38 | 39 | 52 | 53 | 54 | 55 | 40 | 41 | 42 | 43 | 56 | 57 | 58 | 59 |
| 40 | 41 | 42 | 43 | 56 | 57 | 58 | 59 | 36 | 37 | 38 | 39 | 52 | 53 | 54 | 55 |
| 44 | 45 | 46 | 47 | 60 | 61 | 62 | 63 | 32 | 33 | 34 | 35 | 48 | 49 | 50 | 51 |

FIG. 7A, FIG. 7B, FIG. 7C, FIG. 7D

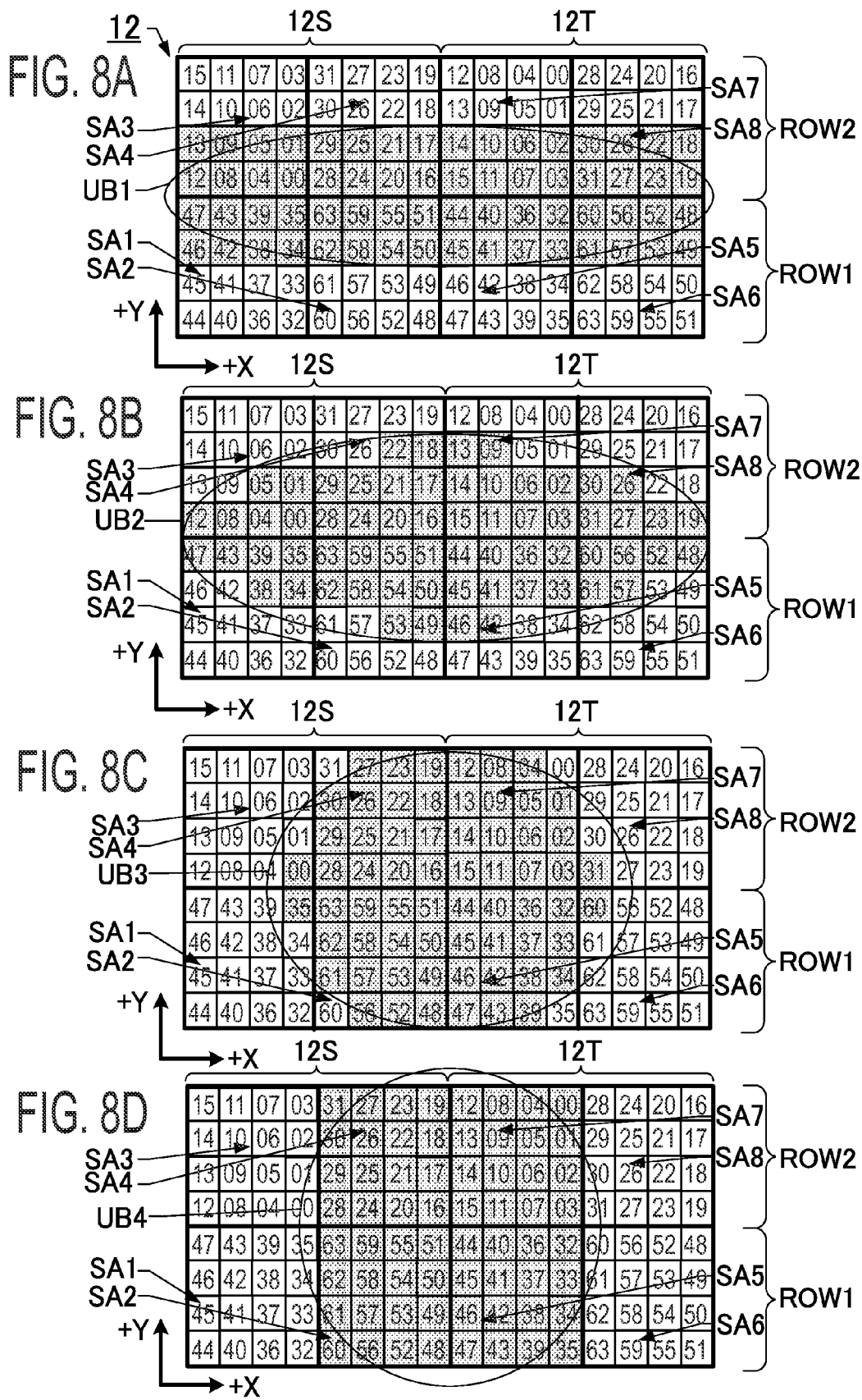

FIG. 9

|  |  | 12S |  |  |  |  |  |  |  | 12T |  |  |  |  |  |
|---|---|---|---|---|---|---|---|---|---|---|---|---|---|---|---|
| SA2 | | | | | | | | | | | SA4 | | | | |
| 32 | 36 | 40 | 44 | 48 | 52 | 56 | 60 | 00 | 04 | 08 | 12 | 16 | 20 | 24 | 28 |
| 33 | 37 | 41 | 45 | 49 | 53 | 57 | 61 | 01 | 05 | 09 | 13 | 17 | 21 | 25 | 29 |
| 34 | 38 | 42 | 46 | 50 | 54 | 58 | 62 | 02 | 06 | 10 | 14 | 18 | 22 | 26 | 30 |
| 35 | 39 | 43 | 47 | 51 | 55 | 59 | 63 | 03 | 07 | 11 | 15 | 19 | 23 | 27 | 31 |
| 00 | 04 | 08 | 12 | 16 | 20 | 24 | 28 | 32 | 36 | 40 | 44 | 48 | 52 | 56 | 60 |
| 01 | 05 | 09 | 13 | 17 | 21 | 25 | 29 | 33 | 37 | 41 | 45 | 49 | 53 | 57 | 61 |
| 02 | 06 | 10 | 14 | 18 | 22 | 26 | 30 | 34 | 38 | 42 | 46 | 50 | 54 | 58 | 62 |
| 03 | 07 | 11 | 15 | 19 | 23 | 27 | 31 | 35 | 39 | 43 | 47 | 51 | 55 | 59 | 63 |

ROW2 (top four rows), ROW1 (bottom four rows)

SA1, SA3

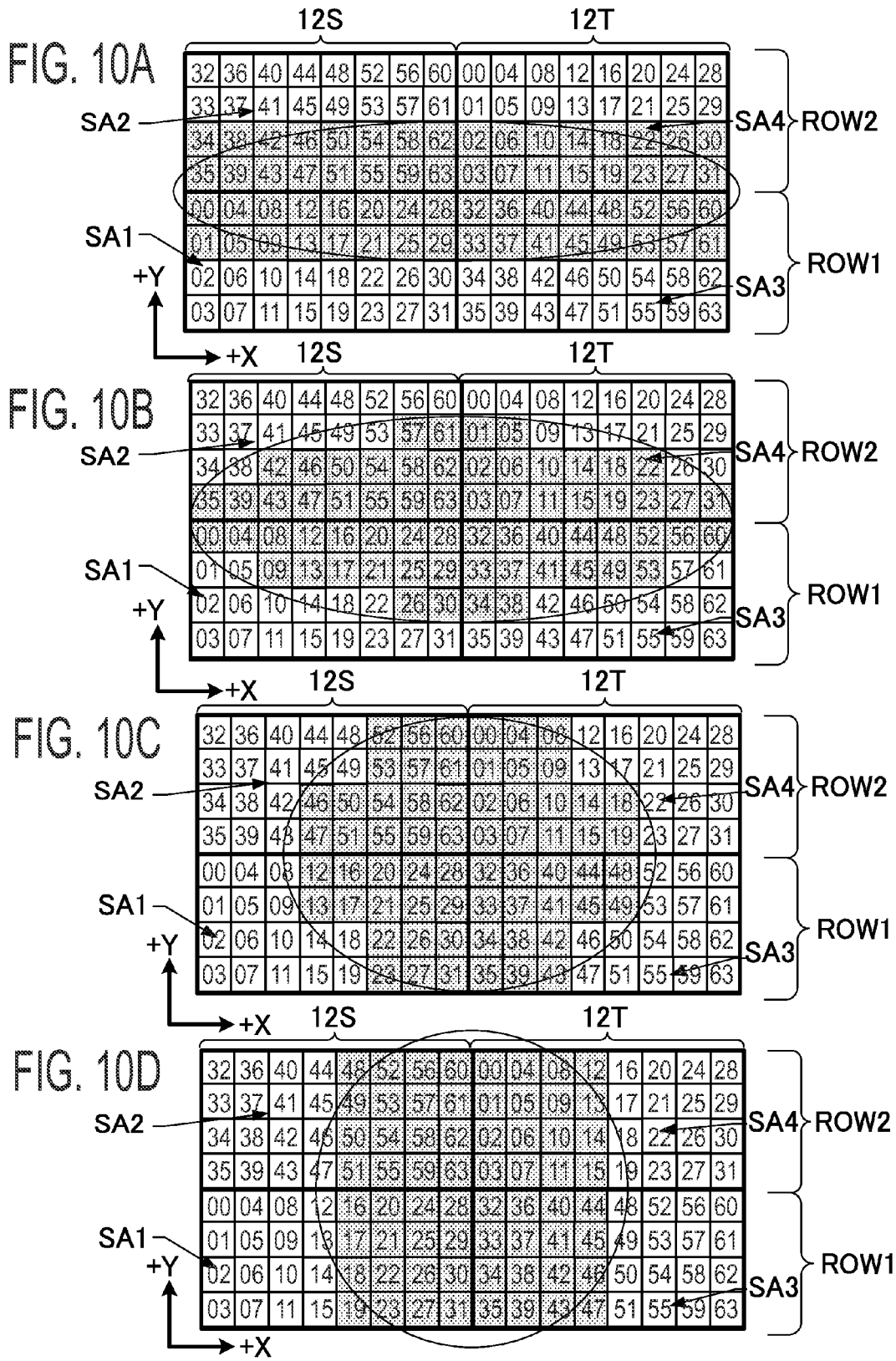

| | 12S | | | | | | | 12T | | | | | | | |
|---|---|---|---|---|---|---|---|---|---|---|---|---|---|---|---|
| | 32 | 36 | 40 | 44 | 48 | 52 | 56 | 60 | 00 | 04 | 08 | 12 | 16 | 20 | 24 | 28 |
| | 33 | 37 | 41 | 45 | 49 | 53 | 57 | 61 | 01 | 05 | 09 | 13 | 17 | 21 | 25 | 29 |
| | 34 | 38 | 42 | 46 | 50 | 54 | 58 | 62 | 02 | 06 | 10 | 14 | 18 | 22 | 26 | 30 |
| | 35 | 39 | 43 | 47 | 51 | 55 | 59 | 63 | 03 | 07 | 11 | 15 | 19 | 23 | 27 | 31 |
| | 00 | 04 | 08 | 12 | 16 | 20 | 24 | 28 | 32 | 36 | 40 | 44 | 48 | 52 | 56 | 60 |
| | 01 | 05 | 09 | 13 | 17 | 21 | 25 | 29 | 33 | 37 | 41 | 45 | 49 | 53 | 57 | 61 |
| | 02 | 06 | 10 | 14 | 18 | 22 | 26 | 30 | 34 | 38 | 42 | 46 | 50 | 54 | 58 | 62 |
| | 03 | 07 | 11 | 15 | 19 | 23 | 27 | 31 | 35 | 39 | 43 | 47 | 51 | 55 | 59 | 63 |

SA2, SA4 → ROW2; SA1, SA3 → ROW1

FIG. 12B (same grid layout as FIG. 12A)

FIG. 12C (same grid layout as FIG. 12A)

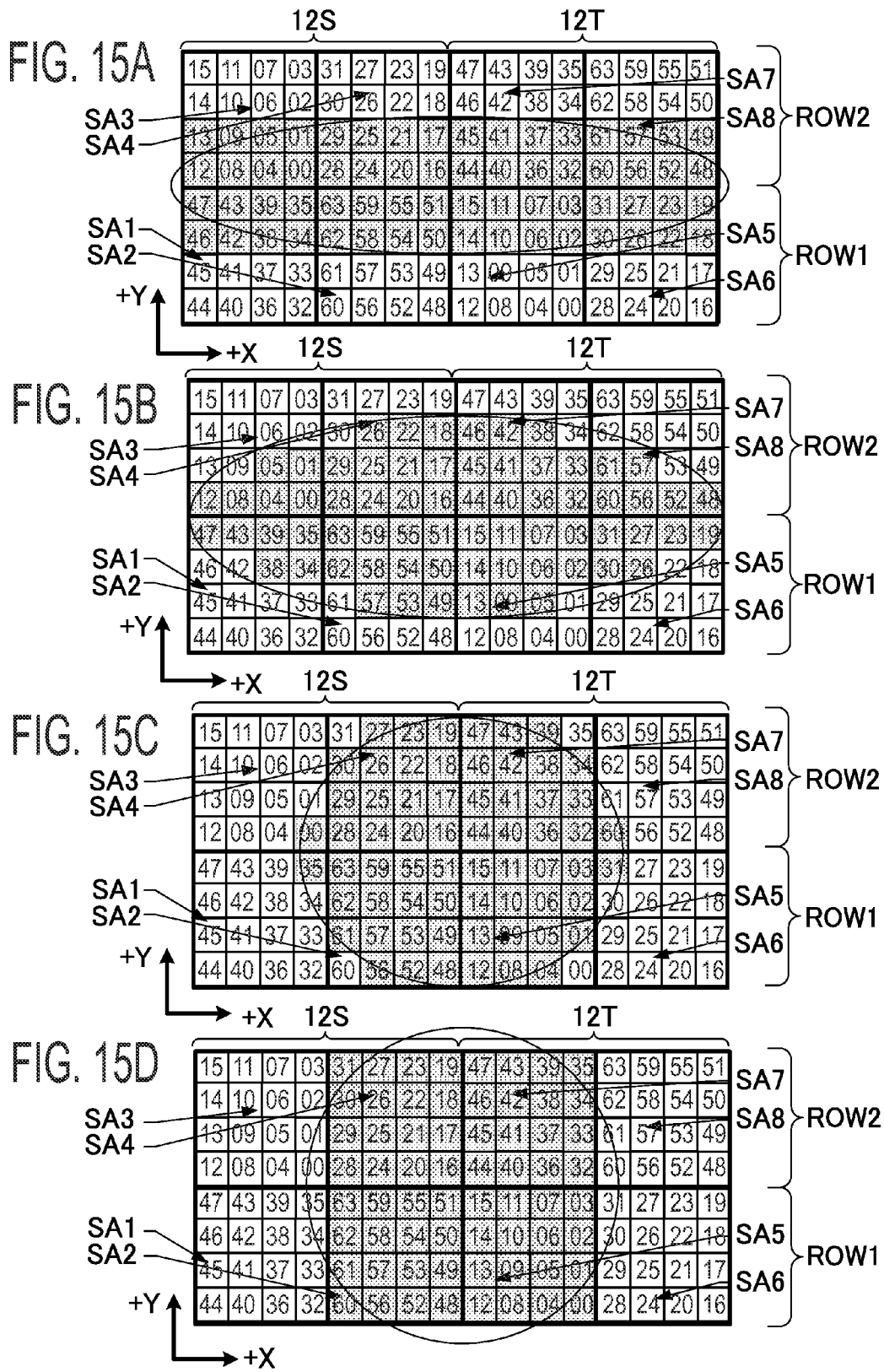

ULTRASOUND PROBE AND ULTRASOUND DIAGNOSTIC APPARATUS

CROSS REFERENCE TO RELATED APPLICATIONS

This application claims the benefit of Japanese Patent Application No. 2010-272123 filed Dec. 7, 2010, which is hereby incorporated by reference in its entirety.

BACKGROUND OF THE INVENTION

This invention relates to an ultrasound probe and an ultrasound diagnostic apparatus, particularly in which the ultrasound probe and the ultrasound diagnostic apparatus thereof change the formation of the transmitted ultrasound beam.

In an ultrasound diagnostic apparatus which transmits an ultrasound beam to a target object for ultrasound imaging, an ultrasound probe for transmitting and receiving an ultrasound beam is connected to the ultrasound diagnostic apparatus. A one-dimensional probe with transducer elements placed in the row direction has an effective resolution performance in the azimuth direction; however, the performance in the elevation direction is determined by the fixed aperture focused in a fixed range. On the other hand, for the purpose of enhancing the performance in the elevation direction, many types of multi-row probes, including a two-dimensional probe, are under development.

When the ultrasound diagnostic apparatus generates a two-dimensional ultrasound image such as a B-mode image, it is preferred to use the one-dimensional probe which transmits an oval-shaped ultrasound beam having high resolution performance in the azimuth direction. Also, when the ultrasound diagnostic apparatus generates a three-dimensional ultrasound image using the two-dimensional probe, it is preferred to use the two-dimensional probe or the multi-row probe, which transmits an ultrasound beam of a true circle, and having equal performance in the azimuth direction and the elevation direction. An example of the two-dimensional probe is disclosed in Japanese unexamined patent 2003-290228. The two-dimensional probe disclosed in Japanese unexamined patent 2003-290228 controls transducer arrays placed two-dimensionally using a matrix switch.

Unfortunately, even if the multi-row probe, such as the two-dimensional probe, is used for generating an ultrasound image, the resolution performance in the azimuth direction remained low. It is desirable that the performance in the azimuth direction of the multi-row probe is enhanced.

SUMMARY OF THE INVENTION

In the first aspect, an ultrasound probe connected to an ultrasound diagnostic apparatus for transmitting an ultrasound beam to a target object is provided. The ultrasound probe includes a switching unit including a N/2 number (wherein N is a natural number) of channels and each channel switches to a first pole and a second pole, first transducer elements having the N/2 number, connected to the first pole and placed in two-dimension, wherein a placement is defined in x-axis and y-axis, and second transducer elements having the N/2 number, connected to the second pole and placed in two-dimension, wherein the placement is defined in x-axis and y-axis. In the ultrasound probe, the placement of a channel number of the first transducer elements and the placement of the channel number of the second transducer elements differ in x-axis and y-axis.

In the second aspect, an ultrasound probe is provided, wherein the N number of the first transducer elements and the second transducer elements are divided in y-axis direction and divided into a first row and a second row, the N number of the transducer elements are placed in the first row so that the channel number of the first transducer elements increases to +y-axis direction and +/−x-axis directions and that the channel number of the second transducer elements increases to −y-axis direction and +/−x-axis directions.

In the ultrasound probe of the second aspect, the switching unit scans to +/−x-axis directions while maintaining changed formation of an aperture.

In the third aspect, an ultrasound probe is provided, wherein the N number of the first transducer elements and the second transducer elements are divided in y-axis direction and divided into the first row and the second row, the N number of the transducer elements are placed so that the channel number of the first transducer elements in the first row increases to +x-axis direction and +/−y-axis directions, and the channel number of the second transducer elements in the second row increases to +x-axis and +/−y-axis directions.

In the fourth aspect, an ultrasound probe is provided, wherein the N number of the first transducer elements and the second transducer elements are divided in y-axis direction and divided into the first row and the second row, the N number of the transducer element is placed in the first row so that the channel number of the first transducer elements increases to −x-axis direction and +/−y-axis directions and that the channel number of the second transducer elements in the second row increases to −x-axis direction and +/−y-axis directions.

In the ultrasound probe of the fourth aspect, the switching unit scans to +/−y-axis directions while maintaining the formation of the aperture.

The switching unit scans to +/−x-axis directions while maintaining changed formation of the aperture.

In the fifth aspect, an ultrasound diagnostic apparatus which adjusts an aperture for transmitting an ultrasound beam to a target object is provided. The ultrasound diagnostic apparatus includes a switching unit including a N/2 number (wherein N is a natural number) of channels, each channel switches to a first pole and a second pole. An ultrasound probe includes first transducer elements having the N/2 number (wherein N is a natural number) connected to the first pole and placed in two-dimension, wherein a placement is defined in x-axis and y-axis, and second transducer elements having the N/2 number connected to the second pole and placed in two-dimension, wherein the placement is defined in x-axis and y-axis, and a driving signal supply unit for supplying a driving signal to the N number of a transducer element through the switching unit. The switching unit switches the N/2 number of channels, and combines the first transducer elements and the second transducer elements, and uses the N/2 number to change a formation of the aperture of the ultrasound beam.

In the sixth aspect, an ultrasound diagnostic apparatus is provided, wherein a channel number of the first transducer elements and the channel number of the second transducer elements differ in x-axis and y-axis directions.

The switching unit scans to +/−y-axis directions while maintaining changed formation of the aperture.

The switching unit scans to +/−x-axis directions while maintaining changed formation of the aperture.

Further advantages will be apparent from the following description of exemplary embodiments and as illustrated in the accompanying drawings.

BRIEF DESCRIPTION OF THE DRAWINGS

FIGS. 4A-4D are diagrams of the first embodiment of changing the formation of aperture while maintaining the area of aperture.

FIGS. 5A-5D are diagrams in the first embodiment, illustrating the aperture sequentially moving in the x-axis direction.

FIG. 6 is a plan view of the second embodiment of the ultrasound transducer, including eight sub arrays.

Figures 7A, 7B, 7C, 7D:
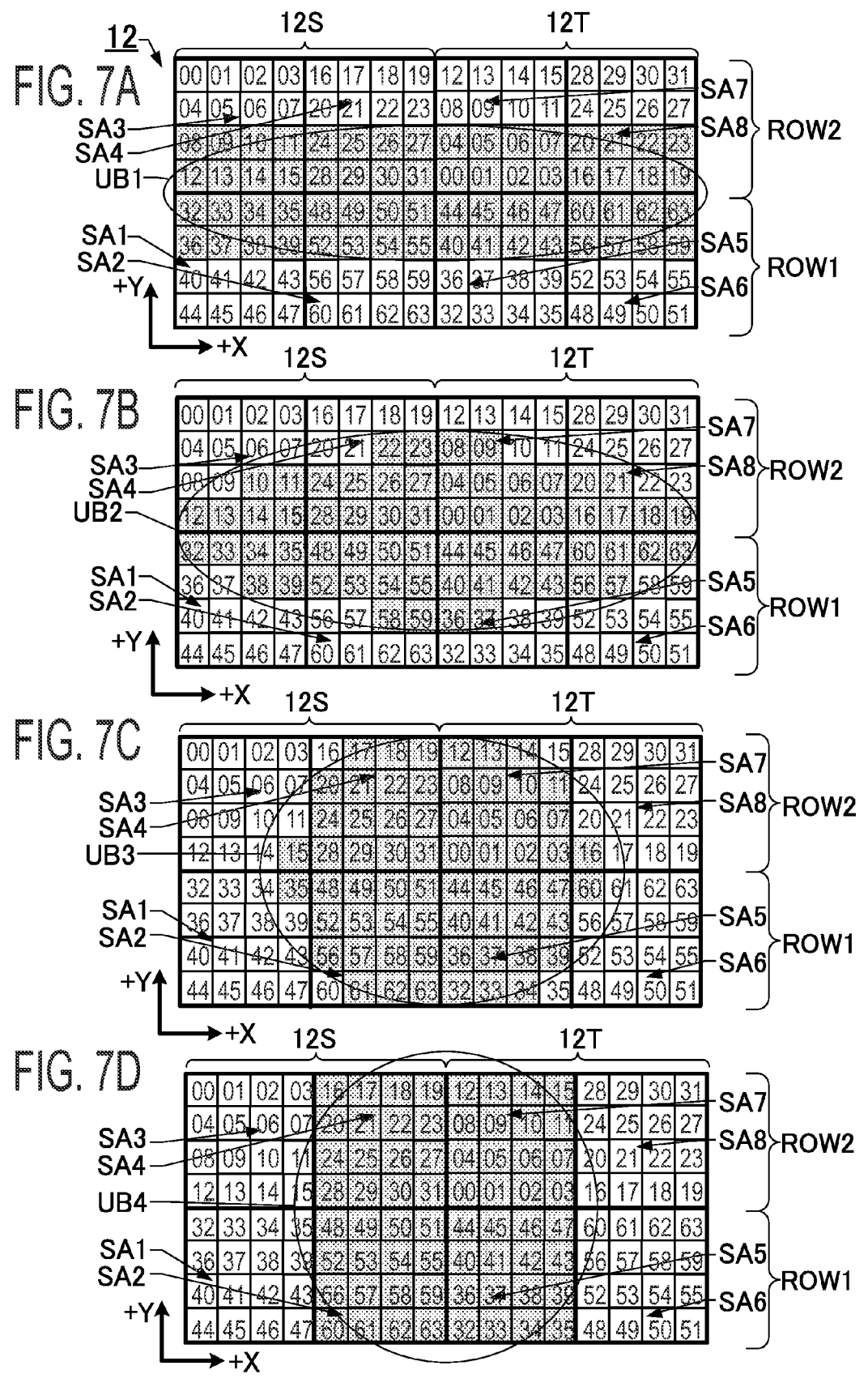

FIGS. 7A-7D are diagrams of the second embodiment of changing the formation of aperture while maintaining the area of aperture.

FIGS. 8A-8D are diagrams of the third embodiment of changing the formation of aperture while maintaining the area of aperture.

FIG. 9 is a plan view of the fourth embodiment of the ultrasound transducer, including four sub arrays.

FIGS. 10A-10D are diagrams of the fourth embodiment of changing the formation of aperture while maintaining the area of aperture unchanging.

FIGS. 11A-11D are diagrams in the fourth embodiment, illustrating the aperture sequentially moving in the x-axis direction.

FIGS. 12A-12C are diagrams in the fourth embodiment, illustrating the aperture sequentially moving in the x y-axis direction.

FIG. 14 is the fifth embodiment of changing the formation of aperture while maintaining the area of aperture unchanging.

FIG. 15 is the sixth embodiment of changing the formation of aperture while maintaining the area of aperture unchanging.

DETAILED DESCRIPTION OF THE INVENTION

Configuration of an Ultrasound Diagnostic Apparatus

Figure 1:
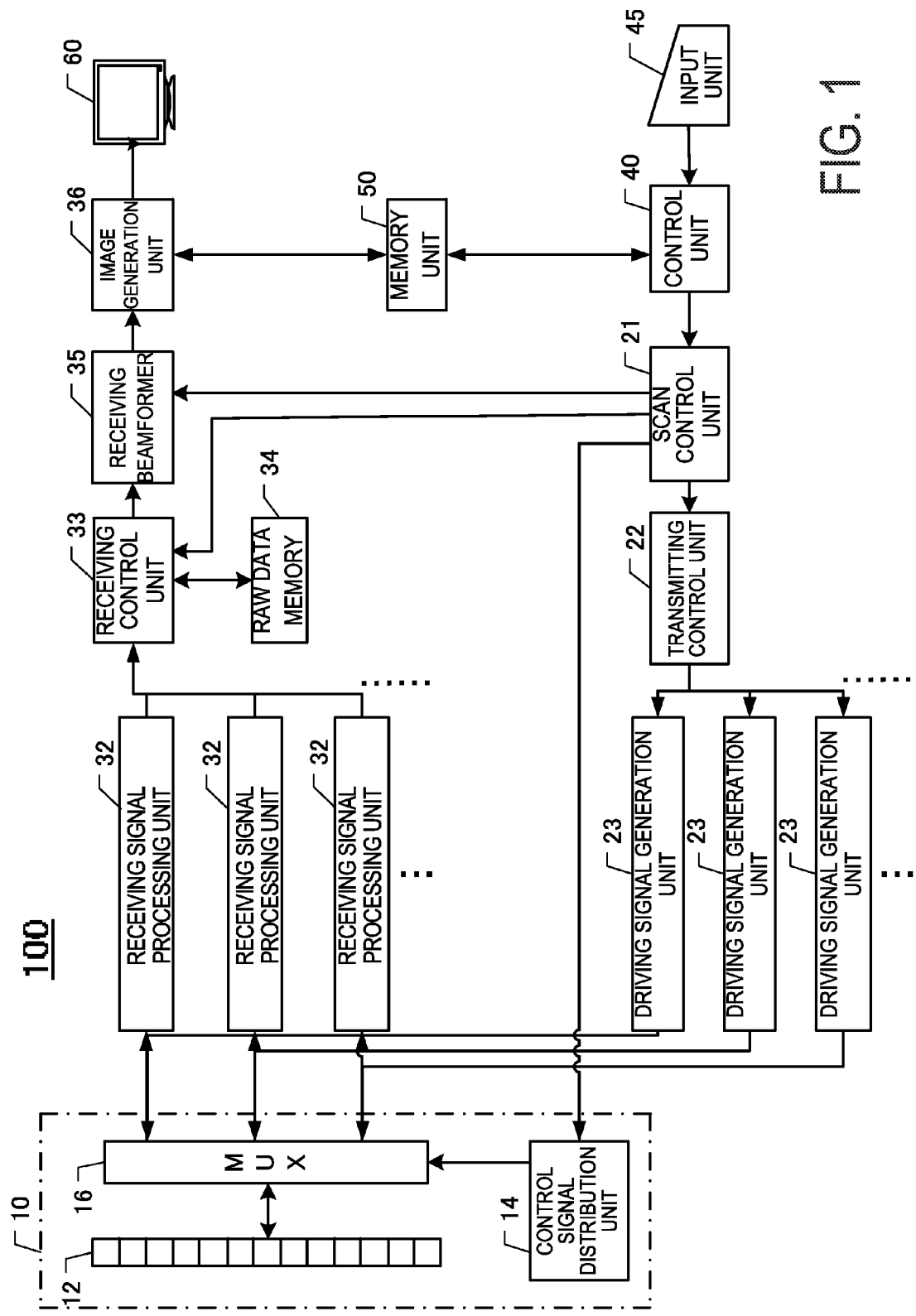
FIG. 1 is a block diagram illustrating an exemplary configuration of the ultrasound diagnostic apparatus.

FIG. 1 is a block diagram illustrating an exemplary configuration of an ultrasound diagnostic apparatus 100. The ultrasound diagnostic apparatus 100 includes an ultrasound probe 10, a scan control unit 21, a transmitting control unit 22 and a driving signal generation unit 23. The ultrasound diagnostic apparatus 100 further includes a receiving signal processing unit 32, a receiving control unit 33, a raw data memory 34, a receiving beamformer 35, an image generation unit 36, a control unit 40, an input unit 45, a memory unit 50 and a display unit 60.

The ultrasound probe 10 includes an ultrasound transducer 12, which transmits an ultrasound beam to the target object according to an inputted driving signal, and outputs a receiving signal by receiving ultrasound echoes reflected from the target object. In this embodiment, the ultrasound transducer 12 includes a N number (N is a natural number of more than two) of transducer elements, placed two-dimensionally. When N is an odd number, an ultrasound transducer 12 placed on the farthest end will not be used. Also, the ultrasound probe 10 includes the control signal distribution unit 14 and one multiplexer (MUX) 16. The detail explanation thereof is hereinafter described.

The ultrasound transducer 12 includes the transducer element, which forms electrode on both end of the piezoelectric material, such as PZT (Pb (lead) zirconate titanate). The transducer element expands and contracts when electric pulse or continuous wave voltage is inputted to the electrode of the transducer element. By the expansion and contraction, an ultrasound wave of either electric pulse or continuous wave is generated from each transducer element, and the ultrasound beam is generated by combining the ultrasound waves. Also, each transducer element receives the ultrasound echo, then, expands and contracts, and generates the electric signal. The electric signal thereof is outputted as a receiving signal of the ultrasound echo.

Before an ultrasound beam is scanned in predetermined imaging area within the target object, the scan control unit 21 sets the transmitting direction, receiving direction and depth of the focus point of ultrasound beam transmitted from the ultrasound probe 10. Also, the scan control unit 21 can set the formation of aperture of the ultrasound transducer 12. Based on settings, the scan control unit 21 controls the control signal distribution unit 14, transmitting control unit 22, multiplexer (MUX) 16, receiving control unit 33 and receiving beamformer 35.

The transmitting control unit 22 sets the delay time (delay pattern) to each driving signal, according to the transmitting direction of the ultrasound beam, depth of the focus point and formation of the aperture, set by the scan control unit 21.

The driving signal generation unit 23 has a N/2 number (N is a natural number of more than two) of channels, and each channel includes pulse for generating driving signal to be supplied to the transducer element (N/2 number) selected among ultrasound transducer 12, based on the delay time set in the transmitting control unit 22. The multiplexer 16 connects the selected transducer element (N/2 number) to a plurality of driving signal generation units 23.

The receiving signal processing unit 32 has a N/2 number (N is a natural number of more than two) of channels. The multiplexer 16 connects selected transducer elements among ultrasound transducer 12 under the control of the scan control unit 21, to the receiving signal processing unit 32.

Each channel in the receiving signal processing unit 32 amplifies a receiving signal outputted from the ultrasound transducer 12, and converts to digital receiving data (raw data). The receiving data are stored in the raw data memory 34 by the receiving control unit 33. The scan control unit 21, the transmitting control unit 22 and the receiving control unit 33 controls the transmitting/receiving behavior of the ultrasound diagnostic apparatus 100.

The receiving beamformer 35 has a plurality of delay patterns (phase matching patterns) according to the receiving direction and the depth of the focus point of the ultrasound echo, and gives delay to each of a plurality of receiving data retrieved from the raw data memory 34 corresponding to the receiving direction and depth of the focus point set by the scan control unit 21, and performs receiving focus processing by adding the receiving data thereof. The sound ray signal (sound ray data) with narrow ultrasound echo is generated due to the receiving focus processing thereof.

The image generation unit 36 performs an envelope demodulation processing to the sound ray data, and further processes logarithmic compression and gain adjustment, to generate B-mode image data. The image generation unit 36 converts generated B-mode image data to the image data for display, which corresponds to the normal television signal scan. The B-mode ultrasound image is displayed in the display unit 60. Also, the B-mode image data is stored in the memory unit 50 on a necessary basis.

The input unit 45 includes the inputting means such as a keyboard and a mouse, and is used when the operator is inputting command and information to the ultrasound diagnostic apparatus. The control unit 40 controls each part of the ultrasound diagnostic apparatus 100, based on the command and information inputted by the input unit 45. In this embodiment, a scan control unit 21, a transmitting control unit 22, a receiving control unit 33, a receiving beamformer 35, an image generation unit 36 and a control unit 40 are configured with CPU and software which commands each processing to CPU. Software is stored in the memory unit 50, such as a hard disk.

In this embodiment, the transmitting control unit 22 controls the driving signal generation unit 23 so that the ultrasound beam is transmitted from a plurality of selected transducer elements among the ultrasound transducer 12. Accordingly, the ultrasound transducer 12 transmits the ultrasound beam to the target object in a plurality of apertures having different formation. Also, the transmitting control unit 22 can control the driving signal generation unit 23, so that it is scanned to the predetermined direction while maintaining the shape of the predetermined aperture.

Figure 2:
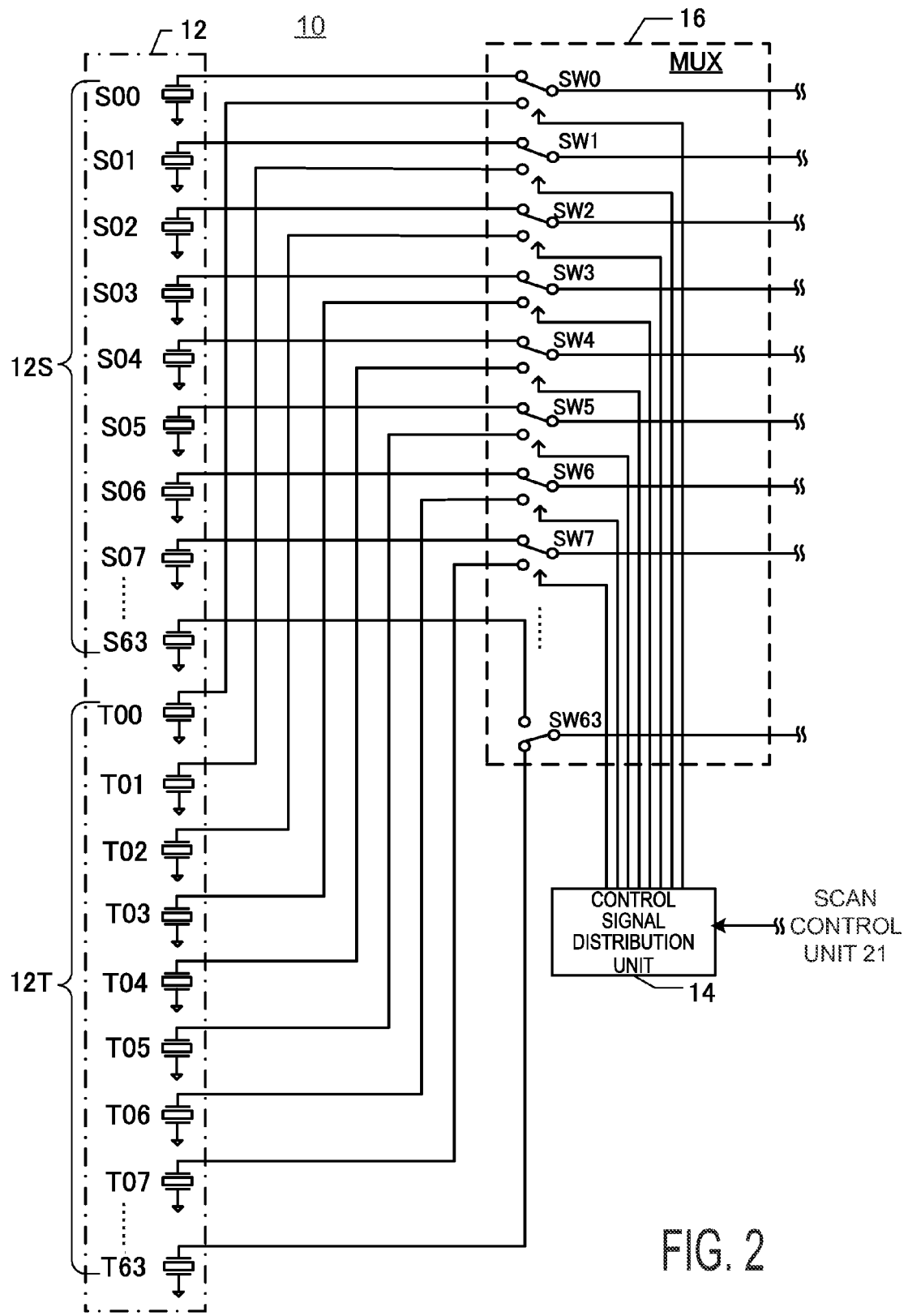
FIG. 2 is a diagram illustrating an example of connecting a control signal distribution unit to a multiplexer.

FIG. 2 is a diagram illustrating the example of connecting the control signal distribution unit 14 and the multiplexer 16, described in FIG. 1. FIG. 2 indicates the ultrasound transducer 12 of 128 channels (N=128). The ultrasound transducer 12 is separated into the first group of the transducer elements 12S (S00-S63) and the second group of the transducer elements 12T (T00-T63). The multiplexer 16 includes sixty-four double-pole switches SW0-SW63. The first pole of the double-pole switches SW0-SW63 are connected to the transducer elements 12S (S00-S63) of the first group, and the second pole of the double-pole switches SW0-SW63 are connected to the transducer elements 12S (T00-T63) of the second group.

The transducer element S00 and the transducer element T00 are switched by the double-pole switch SW0, and the transducer element S01 and the transducer element T01 are switched by the double-pole switch SW1. Similarly, the transducer element S63 and the transducer element T63 are switched by the double-pole switch SW63.

Double-pole switch SW0-double-pole switch SW63 are switched by the multiplexer 16 indicated in FIG. 2, and several elements from the first group of transducer elements 12S (S00-S63) and the several elements from the second group of transducer elements 12T (T00-T63) are selected. The number of selected transducer elements is always sixty-four, and driving signals are supplied to sixty-four transducer elements thereof, and the ultrasound beam transmitted from the transducer elements thereof forms predetermined formation of the aperture.

Formation of the Ultrasound Beam

Figure 3A:
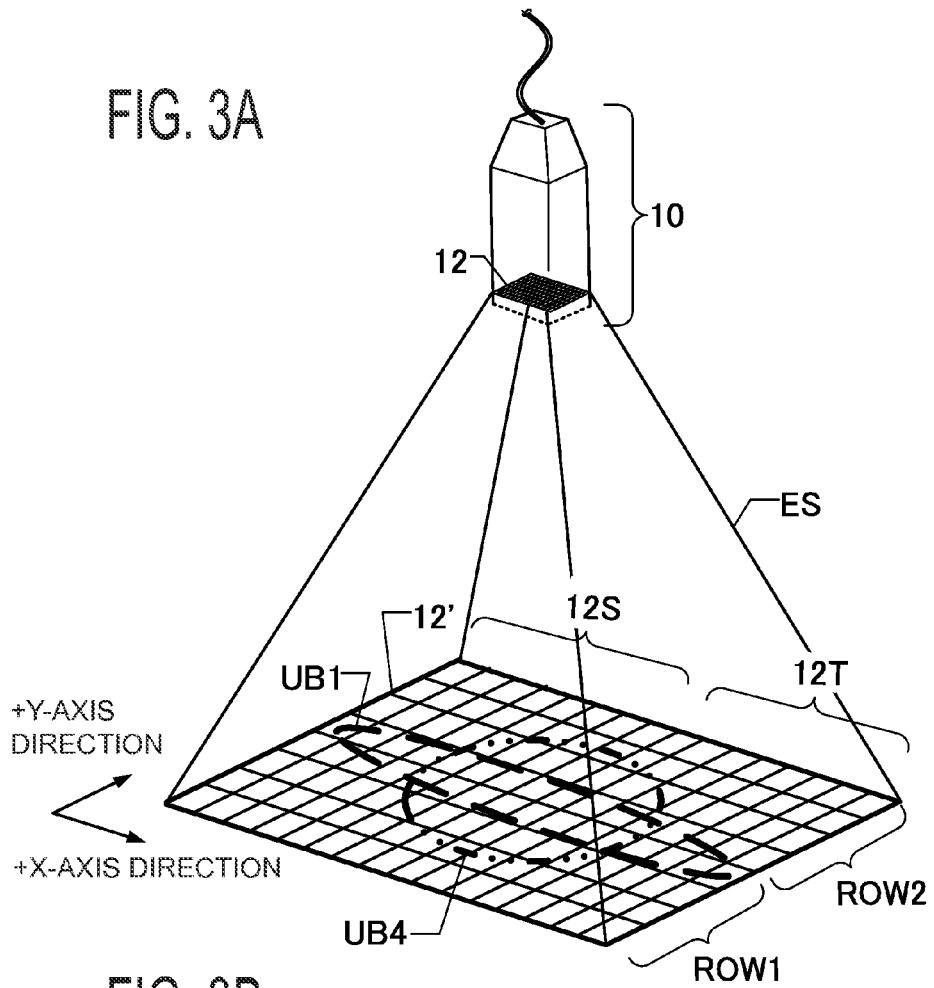
FIG. 3A is a diagram illustrating the relationship between an ultrasound probe and an echo space ES.

FIG. 3A is a diagram illustrating the relationship between the ultrasound probe 10 and the echo space ES. The matrix schematically described as a bottom surface of the echo space ES indicates the ultrasound transducer 12' of projected 128 channels. In FIG. 3A, sixteen transducer arrays in the x-axis direction and eight transducer arrays in the y-axis direction are placed, and a total of 128 transducer arrays are shown.

The ultrasound transducer 12 can transmit the ultrasound beam to the target object with a plurality of apertures having different formation, depending on the selected transducer element. For example, the ultrasound transducer 12 transmits thin and long oval-shape ultrasound beam UB1 or true-circle ultrasound beam UB4, as shown in FIG. 3A.

When the ultrasound diagnostic apparatus 100 displays the B-mode two-dimensional ultrasound image in the display unit 60, the resolution performance in the x-axis direction (azimuth direction) is demanded on the screen, and the y-axis direction is not demanded on the screen. That is, when the area of the aperture is constant, a large aperture in the x-axis direction (azimuth direction) and a narrow aperture to the y-axis direction (elevation direction) is preferred in some embodiments. Therefore, when displaying the two-dimensional ultrasound image, in some embodiments, a thin and long oval-shaped ultrasound beam UB1 is transmitted to the target object. This ultrasound beam UB1 is almost the same as the ultrasound beam transmitted to the normal 1-dimensional probe or 1.25-dimensional probe. On the other hand, when displaying the ultrasound image on the display unit 60 in real-time, a true circle having uniform directional characteristic is preferred in some embodiments. Therefore, in some embodiments an ultrasound beam UB4 with true circle is transmitted to the target object.

Figure 3B:
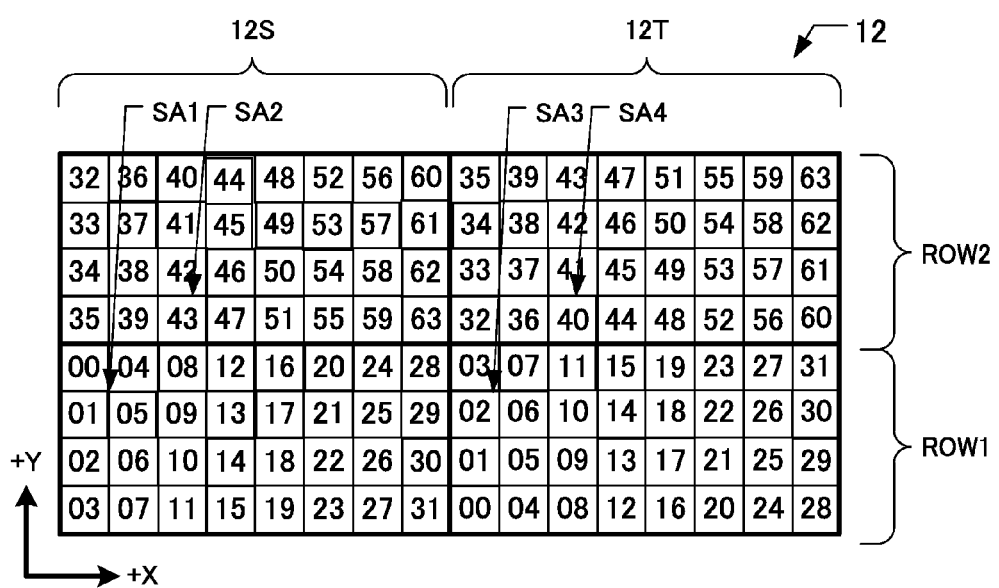
FIG. 3B is a plan view of the ultrasound transducer including four sub arrays.

FIG. 3B is a plan view of the ultrasound transducer 12. In the ultrasound transducer 12, for example, sixteen transducer elements in the x-axis direction and eight transducer elements in the y-axis direction are placed. The ultrasound transducer 12 is divided into a plurality of blocks, for setting a plurality of sub arrays. In FIG. 3B, sub arrays (SA1-SA4) divided into four blocks are placed next to each other. In FIG. 3B, in one sub array (SA1-SA4), eight transducer elements are placed in the x-axis direction and four transducer elements are placed in the y-axis direction. This is one example of placing the transducer element.

As indicated in FIG. 3(B), a channel number is written on each transducer element, to provide a better understanding. In FIG. 3(B), two sub arrays (SA1-SA2) of left half are the first group of the transducer element 12S (S00-S63), which is connected to the first pole of the switch SW0-SW63 of the multiplexer 16, as indicated in FIG. 2. Two sub arrays (SA3-SA4) of right half are the second group of the transducer element 12T (T00-T63), which is connected to the second pole of the switch SW0-SW63.

As indicated in FIG. 3A and FIG. 3B, for the purpose of explaining the placement of the transducer element in FIG. 4 and thereafter, the ultrasound transducer 12 of the left bottom is marked as the point of origin, and the horizontal direction is called the x-axis direction (azimuth direction) and the vertical direction is called the y-axis direction (elevation direction). Also, the bottom half of the sub arrays (SA1 and SA3) are called as the first row (ROW1) and the top half of the sub arrays (SA2 and SA4) are called as the second row (ROW2). In each embodiment described hereafter, even when the placement of the transducer element is different, the sub arrays on the bottom half is called as the first row (ROW1) and the sub arrays on the top half is called as the second row (ROW2).

The Placement of the Ultrasound Transducer

First Embodiment

FIGS. 4A-4D are illustrations of the first embodiment of changing the formation of aperture while maintaining the area of aperture. In the ultrasound transducer 12 described in FIGS. 4A-4D, transducer elements are placed as described.

The transducer element 12S of the first group (S00-S063) includes two sub arrays (SA1-SA2). The channel number of the transducer element of the sub array SA1 in the first row is placed so that the channel number increases in the +x-axis direction and −y-axis direction, as indicated by S00 to S31. Similarly, the channel number of the transducer element of the sub array SA2 in the second row is placed so that the channel number increases in the +x-axis direction and −y-axis direction, as indicated by S32 to S63.

In the transducer element 12T (T00-T63) of the second group, channel number of the transducer element of the sub array SA3 in the first row is placed so that the channel number increases in the +x-axis direction and +y-axis direction, as indicated by T00 to T31. Similarly, the channel number of the transducer element of the sub array SA4 in the second row is placed so that the channel number increases in the +x-axis direction and +y-axis direction, as indicated by T32 to T63.

In FIG. 4A, the multiplexer 16 changes the double-pole switch SW0-SW63 based on the control signal from the scan control unit 21 (refer to FIG. 2), and a total of sixty-four transducer elements, shown hatched, are driven. Specifically, the transducer elements 12S, S00, S01, S04, S05 . . . , S58, S59, S62 and S63 among the first group are driven and the transducer elements 12T, T02, T03, T06, T07 . . . , T56, T57, T60 and T61 among the second group are driven.

As indicated in FIG. 4A, when the transducer element S00 is driven, the transducer element T00, switched by the double-pole switch SW0, is not driven. Similarly, when the transducer element T03 is driven, the transducer element S03, switched by the double-pole switch SW3 is not driven.

Sixty-four transducer elements shown hatched form an aperture extending in the x-axis direction and narrowing in the y-axis direction. Thereby, the ultrasound transducer 12 can transmit thin and long ultrasound beam UB1.

In FIG. 4B, the multiplexer 16 changes the double-pole switch SW0 to SW63 based on the control signal from the scan control unit 21, and a total of sixty-four transducer elements, shown hatched, are driven. Specifically, the transducer elements 12S, S00, S04, S08, S09 . . . , S59, S60, S62 and S63 among the first group are driven and the transducer elements 12T, T02, T03, T06, T07 . . . , T52, T53, T56 and T60 among the second group are driven.

When the transducer element S61 is driven, the transducer element T61, switched by the double-pole switch SW61, is not driven. Similarly, when the transducer element T60 is driven, the transducer element S60, switched by the double-pole switch SW60 is not driven.

Sixty-four transducer elements shown hatched form a rhombic-shaped aperture. Thereby, the ultrasound transducer 12 can transmit an oval-shaped ultrasound beam UB2 which is thicker than the ultrasound beam UB1.

Similarly with FIG. 4C, the multiplexer 16 changes the double-pole switch SW0 to SW63 based on the control signal from the scan control unit 21. A total of sixty-four transducer elements, shown hatched, are driven. A total of sixty-four transducer elements, shown hatched, forms an aperture having a shape close to square. Thereby, the ultrasound transducer 12 can transmit an oval-shaped ultrasound beam UB3 which is thicker than the ultrasound beam UB2.

Similarly with FIG. 4D, the multiplexer 16 changes the double-pole switch SW0 to SW63 based on the control signal from the scan control unit 21. A total of sixty-four transducer elements, shown hatched, are driven. A total of sixty-four transducer elements, shown hatched, forms a square-shaped aperture. Thereby, the ultrasound transducer 12 can transmit an ultrasound beam UB4 of true circle.

FIGS. 5A-5D are diagrams illustrating the aperture, including a total of sixty-four transducer elements which is indicated in FIG. 4C as hatched, is sequentially moving. The oval-shaped ultrasound beam UB3 in the −x-axis direction is scanning sequentially in this order: FIG. 5A, FIG. 5B, FIG. 5C, and FIG. 5D.

In FIG. 5A, the transducer elements 12S, S12, S16, S17, S18 . . . , S60, S61, S62 and S63 among the first group are driven and the transducer elements 12T, T01, T02, T03, T04 . . . , T44, T45, T46 and T48 among the second group are driven. When the transducer element S52 is driven, the transducer element T52, switched by the double-pole switch SW52, is not driven. Similarly, when the transducer element T48 is driven, the transducer element S48, switched by the double-pole switch SW48 is not driven.

In FIG. 5B, a total of sixty-four transducer elements shown hatched, as described in FIG. 5A are driven so that all transducer elements are shifting to left by one element. In FIG. 5C, a total of sixty-four transducer elements shown hatched, as described in FIG. 5B are driven so that all transducer elements are shifting to left by one element. Further, in FIG. 5D, a total of sixty-four transducer elements shown hatched, as described in FIG. 5C are driven so that all transducer elements are shifting to left by one element.

In FIG. 5D, the transducer elements 12T, T01, T02, T03, T07, T32, T33, T34, and T36 among the second group are driven; however, the transducer elements 12S, S01, S02, S03, S07, S32, S33, S34 and S36 among the first group are not driven.

Similarly with the descriptions corresponding to FIGS. 5A-5D, the ultrasound beam UB1 indicated in FIG. 4A, the ultrasound beam UB2 indicated in FIG. 4B and the ultrasound beam UB4 indicated in FIG. 4D can also scan in the x-axis direction. Further, transducer elements on the end of the x-axis region, such as the transducer element S00, S35, T60 and T61 of FIG. 4A and FIG. 4B, are driven. Therefore, with the number of channels described in FIGS. 4A-4D, the ultrasound beam UB3 and ultrasound beam UB4 cannot scan in the +/−x-axis directions. However, by using triple-pole switches instead of double-pole switches, or increasing the number of transducer elements, the ultrasound beam UB1 or the ultrasound beam UB2 can be scanned.

The Placement of the Ultrasound Transducer

Second Embodiment

FIG. 6 and FIGS. 7A-7D are the second embodiment of changing the formation of aperture while maintaining the area of aperture, which is a modified example of the first embodiment. In the ultrasound transducer 12 described in FIGS. 7A-7D, the transducer elements are placed as indicated in FIG. 6.

As indicated in FIG. 6, the ultrasound transducer 12 in the second embodiment includes eight sub arrays (SA1-SA8).

The transducer element 12S (S00-S63) of the first group includes four sub arrays (SA1-SA4). The channel number of the transducer element of the sub array SA1 of the first row increases in the +x-axis direction and −y-axis direction, as indicated by S32 to S47. The channel number of the transducer element of the sub array SA2 are placed from S48 to S63 in a similar manner. Similarly, the channel number of the transducer element of the sub array SA3 of the second row increases in the +x-axis direction and −y-axis direction, as indicated by S00 to S15. The channel number of the transducer element of the sub array SA4 are placed from S16 to S31, in a similar manner.

In the transducer element 12T (T00-T63) of the second group, the channel number of the transducer element of the sub array SA5 of the first row increases in the +x-axis direction and +y-axis direction, as indicated by T32 to T47. The channel number of the transducer element of the sub array SA6 are placed from T48 to T63 in a similar manner. Similarly, the channel number of the transducer element of the sub array SA7 of the second row increases in the +x-axis direction and +y-axis direction, as indicated by T00 to T15. The channel number of the transducer element of the sub array SA8 are placed from T16 to T32, in a similar manner.

As described above, the placement of transducer elements of the ultrasound transducer 12 in FIG. 6 is different from the placement of the transducer element described in FIGS. 4A-4D, so that the number of sub array is different. Also, the position of the transducer element S00 is different, so that the transducer element S00 is located in the second row, as opposed to the first row in the previous embodiment, and the channel number increases in the +x-axis direction, as opposed to −y-axis direction in the previous embodiment. Even though the placement is different, the ultrasound beam UB1—ultrasound beam UB4 can be transmitted by changing the driving region of sixty-four transducer elements, as indicated in FIGS. 7A-7D. Also, the ultrasound transducer 12 described in FIGS. 7A-7D can scan the ultrasound beam UB1—ultrasound beam UB4 in the x-axis direction, similarly with the ultrasound beam UB2 of FIGS. 5A-5D.

The Placement of the Ultrasound Transducer

Third Embodiment

FIG. 8 is the third embodiment of changing the formation of aperture while maintaining the area of aperture, which is a modified example of the first embodiment. The ultrasound transducer 12 described in FIG. 8 (A)-(D) includes eight sub arrays, which is similar to the second embodiment. The transducer elements are placed as indicated below.

In the transducer element 12S (S00-S63) of the first group, the channel number of the transducer element of the sub array SA1 in the first row decreases in the +x-axis direction and −y-axis direction, as indicated by S47 to S32. The channel number of the transducer element of the sub array SA2 are placed from S63 to S48 in a similar manner. Similarly, the channel number of the transducer element of the sub array SA3 in the second row decreases in the +x-axis direction and −y-axis direction, as indicated by S15 to S00. The channel number of the transducer element of the sub array SA4 are placed from S31 to S16 in a similar manner.

In the transducer element 12T (T00-T63) of the second group, the channel number of the transducer element of the sub array SA5 in the first row decreases in the +x-axis direction and +y-axis direction, as indicated by T47 to T32. The channel number of the transducer element of the sub array SA6 are placed from T63 to T48 in a similar manner. Similarly, the channel number of the transducer element of the sub array SA7 in the second row decreases in the +x-axis direction and +y-axis direction, as indicated by T15 to T00. The channel number of the transducer element of the sub array SA8 are placed from T31 to T16 in a similar manner.

As described above, the placement of transducer elements of the ultrasound transducer 12 in FIGS. 8A-8D is different from the placement of the transducer element described in FIGS. 7A-7D, so that the channel number in the sub array increases in an opposite direction. Even though the placement is different, the ultrasound beam UB1—ultrasound beam UB4 can be transmitted by changing the driving region of sixty-four transducer elements, as indicated in FIGS. 8A-8D. Also, the ultrasound transducer 12 described in FIGS. 8A-8D can scan the ultrasound beam UB1—ultrasound beam UB4 in the x-axis direction, similarly with the ultrasound beam UB2 of FIGS. 5A-5D.

The Placement of the Ultrasound Transducer

Fourth Embodiment

FIG. 9 and FIGS. 10A-10D are the fourth embodiment of changing the formation of aperture while maintaining the area of aperture. The transducer element 12S of the first group and the transducer element 12T of the second group are placed so that it corresponds to each other, which is different from the first to third embodiments. The transducer elements of the ultrasound transducer 12 described in FIG. 9 and FIGS. 10A-10D are placed as indicated below.

As indicated in FIG. 9, the ultrasound transducer 12 includes four sub arrays (SA1-SA4).

In the transducer element 12S of the first group, the channel number of the transducer element of the sub array SA1 in the first row is placed so that the channel number increases in the +x-axis direction and −y-axis direction, as indicated by S00 to S31. Similarly, the channel number of the transducer element of the sub array SA2 in the second row is placed so that the channel number increases in the +x-axis direction and the −y-axis direction, as indicated by S32 to S63.

In the transducer element 12T of the second group, the channel number of the transducer element of the sub array SA4 in the second row is placed so that the channel number increases in the +x-axis direction and −y-axis direction, as indicated by T00 to T31. Similarly, the channel number of the transducer element of the sub array SA3 in the first row is placed so that the channel number increases in the +x-axis direction and the −y-axis direction, as indicated by T32 to T63.

In FIG. 10A, the multiplexer 16 changes the double-pole switch SW0 to SW63 based on the control signal from the scan control unit 21 (shown in FIG. 2), and a total of sixty-four transducer elements, shown hatched, are driven. Specifically, the transducer elements 12S, S00, S01, S04, S05 . . . , S58, S59, S62, S63 among the first group and the transducer elements 12T of T02, T03, T06, T07 . . . , T56, T57, T60 and T61 among the second group are driven.

As indicated in FIG. 10A, when the transducer element S00 is driven, the transducer element T00, switched by the double-pole switch SW0, is not driven. Similarly, when the transducer element T03 is driven, the transducer element S03, switched by the double-pole switch SW3 is not driven.

A total of sixty-four transducer elements, shown hatched, form an aperture extending in the x-axis direction and narrowing to y-axis direction. Thereby, the ultrasound transducer 12 can transmit thin and long ultrasound beam UB1.

Similarly, in FIG. 10B, the multiplexer 16 changes the double-pole switch SW0 to SW63 based on the control signal from the scan control unit 21 (shown in FIG. 2). A total of sixty-four transducer elements, shown hatched, are driven. A total of sixty-four transducer elements, shown hatched, form a rhombic-shaped aperture. Thereby, the ultrasound transducer 12 can transmit an oval-shaped ultrasound beam UB2 which is thicker than the ultrasound beam UB1.

Similarly, in FIG. 10C, the multiplexer 16 changes the double-pole switch SW0 to SW63 based on the control signal from the scan control unit 21 (shown in FIG. 2). A total of sixty-four transducer elements, shown hatched, are driven. A total of sixty-four transducer elements, shown hatched, form a square-shaped aperture. Thereby, the ultrasound transducer 12 can transmit an oval-shaped ultrasound beam UB3 which is thicker than the ultrasound beam UB2.

Similarly, in FIG. 10D, the multiplexer 16 changes the double-pole switch SW0 to SW63 based on the control signal from the scan control unit 21 (shown in FIG. 2). A total of sixty-four transducer elements, shown hatched, are driven. A total of sixty-four transducer elements, shown hatched, form a square-shaped aperture. Thereby, the ultrasound transducer 12 can transmit a circular-shaped ultrasound beam UB4.

FIGS. 11A-11D are diagrams illustrating the aperture, including a total of sixty-four transducer elements which is indicated in FIG. 10C as hatched, is sequentially moving. The oval-shaped ultrasound beam UB3 to the −x-axis direction is scanning sequentially in this order: FIG. 11A, FIG. 11B, FIG. 11C, and FIG. 11D.

Figures 11A, 11B, 11C, 11D:
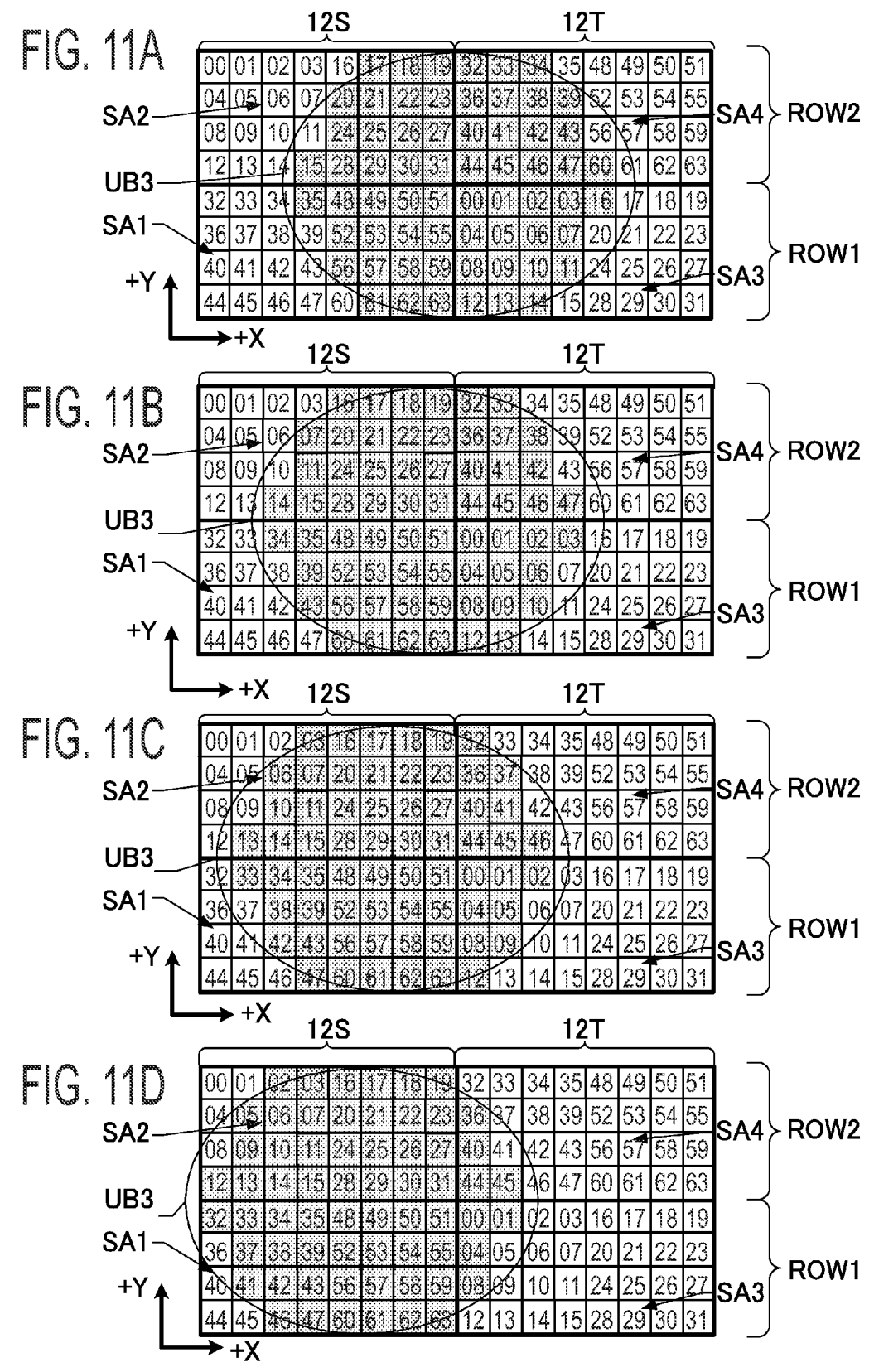

In FIG. 11A, the transducer elements 12S, S15, S16, S17, S18 . . . , S59, S61, S62 and S63 among the first group are driven and the transducer elements 12T, T00, T01, T02, T03 . . . , T45, T46, T47 and T60 among the second group are driven. When the transducer element S15 is driven, the transducer element T15, switched by the double-pole switch SW15, is not driven. Similarly, when the transducer element T60 is driven, the transducer element S60, switched by the double-pole switch SW60 is not driven.

In FIG. 11B, a total of sixty-four transducer elements shown hatched, as described in FIG. 11A are driven so that all transducer elements are shifting to left by one element. In FIG. 11C, a total of sixty-four transducer elements shown hatched, as described in FIG. 11B are driven so that all transducer elements are shifting to left by one element. Further, in FIG. 11D, a total of sixty-four transducer elements shown hatched, as described in FIG. 11C are driven so that all transducer elements are shifting to left by one element.

In FIG. 11D, the transducer element 12T, T00, T01, T04, T08, T36, T40, T44 and T45 among the second group are driven; however, the transducer element 12S, S00, S01, S04, S08, S36, S40, S44 and S45 among the first group are not driven.

The ultrasound beam UB1 indicated in FIG. 10A, the ultrasound beam UB2 indicated in FIG. 10B and the ultrasound beam UB4 indicated in FIG. 10D can also scan in the x-axis direction.

FIGS. 12A-12C are diagrams illustrating the aperture, including a total of sixty-four transducer elements which is indicated in FIG. 10A as hatched is sequentially moving. The long oval-shaped ultrasound beam UB1 in the −y-axis direction is scanning sequentially in this order: FIG. 12A, FIG. 12B, and FIG. 12C. Different from the first embodiment to third embodiment, the placement of the fourth embodiment allows the ultrasound beam to scan in the y-axis direction.

In FIG. 12A, the transducer element 12S, S00, S01, S04, S05 . . . , S58, S59, S62 and S63 among the first group are driven and the transducer element 12T, T02, T03, T06, T07 . . . , T56, T57, T60 and T61 among the second group are driven. When the transducer element S00 is driven, the transducer element T00, switched by the double-pole switch SW0, is not driven.

In FIG. 12B, a total of sixty-four transducer elements shown hatched, as described in FIG. 12A are driven so that all transducer elements are shifting to down by one element. In FIG. 12C, a total of sixty-four transducer elements shown hatched, as described in FIG. 12B are driven so that all transducer elements are shifting to down by one element. In FIG. 12C, the transducer elements in the first row, the transducer element 12S of the first group and the transducer element 12T of the second group, are driven.

The ultrasound beam UB2 indicated in FIG. 10B, the ultrasound beam UB3 indicated in FIG. 10C and the ultrasound beam UB4 indicated in FIG. 10D can also scan in the y-axis direction. Further, in FIG. 10C and FIG. 10D, transducer elements on the end of y-axis region are driven. Therefore, with the number of channels described in FIGS. 10A-10D, the ultrasound beam UB3 and ultrasound beam UB4 cannot scan in the +/−y-axis directions. However, by increasing the number of transducer elements, the ultrasound beam UB3 or the ultrasound beam UB4 can be scanned.

The Placement of the Ultrasound Transducer

Fifth Embodiment

Figure 13:
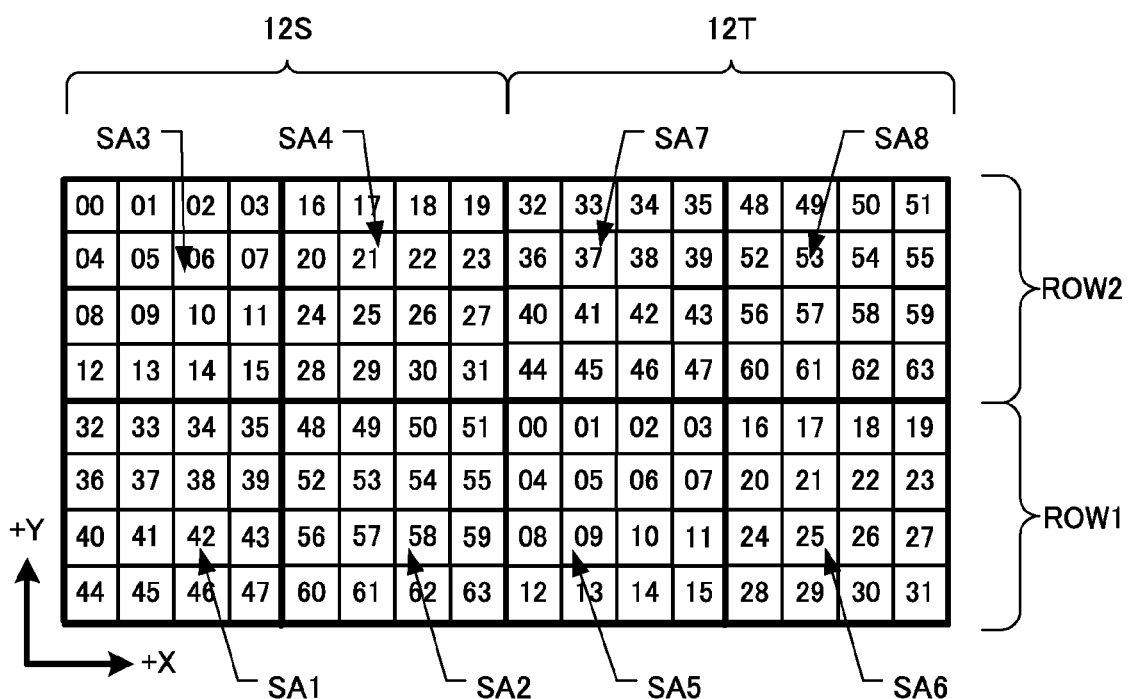
FIG. 13 is a plan view of the fifth embodiment of the ultrasound transducer, including eight sub arrays.
Figures 14A, 14B, 14C, 14D:
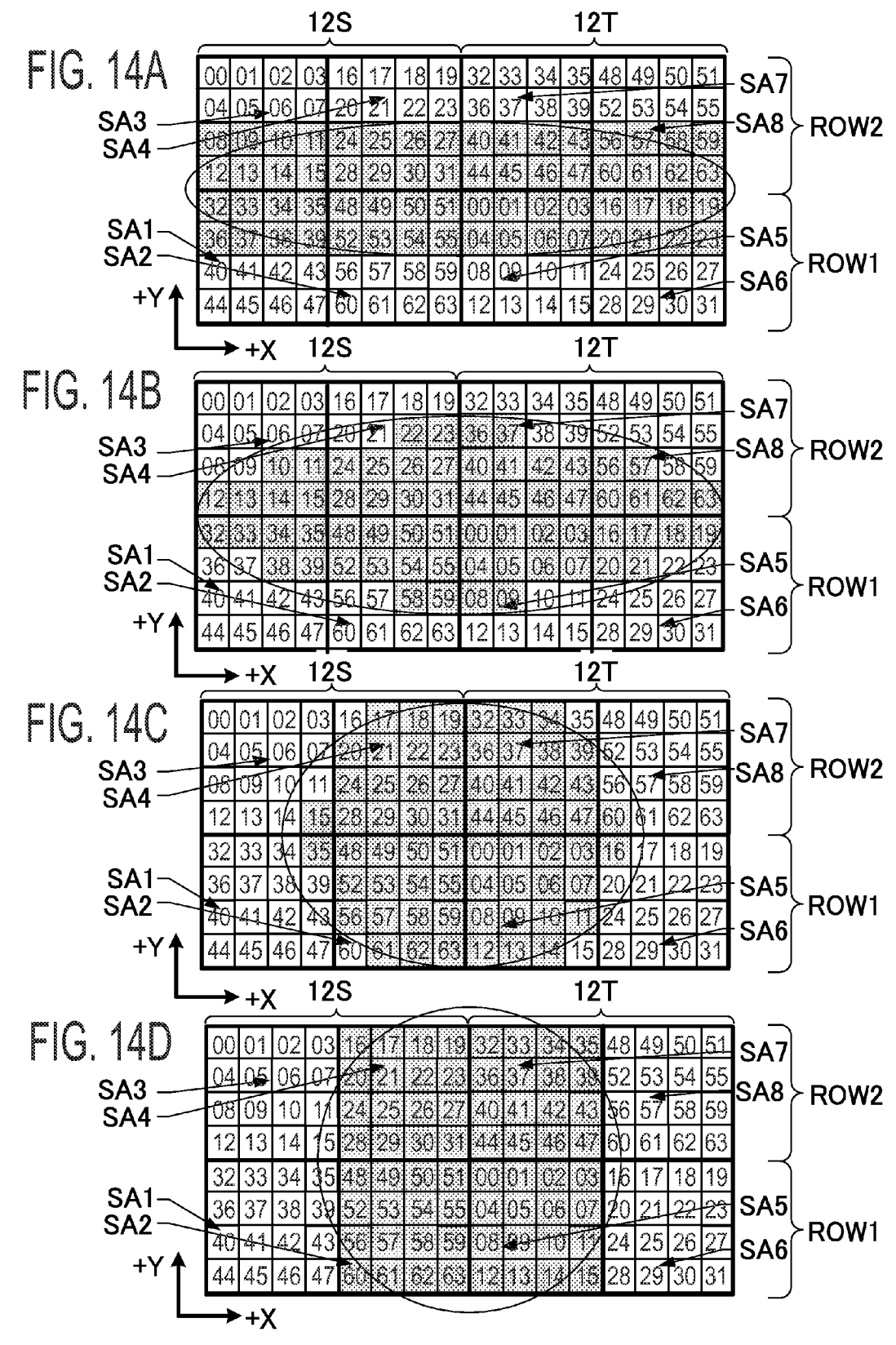

FIG. 13 and FIG. 14 are the fifth embodiment of changing the formation of aperture while maintaining the area of aperture, which is a modified example of the fourth embodiment. The transducer element 12 described in FIG. 13 and FIG. 14 (A)-(D) are placed as indicated below.

As indicated in FIG. 13, the ultrasound transducer 12 includes eight sub arrays (SA1-SA8).

The transducer element 12S (S00-S63) of the first group includes four sub arrays (SA1-SA4). The channel number of transducer elements of the sub array SA1 of the first row increases in the +x-axis direction and −y-axis direction, as indicated by S32 to S47. The channel numbers of transducer elements of the sub array SA2 are placed from S48 to S63 in a similar manner. Similarly, the channel number of transducer elements of the sub array SA3 of the second row increases in the +x-axis direction and −y-axis direction, as indicated by S00 to S15. The channel numbers of transducer elements of the sub array SA4 are placed from S16 to S31, in a similar manner.

In the transducer element 12T (T00-T63) of the second group, the channel numbers of transducer elements of the sub array SA5 of the first row increases in the +x-axis direction and −y-axis direction, as indicated by T00 to T15. The channel numbers of transducer elements of the sub array SA6 are placed from T16 to T31 in a similar manner. Similarly, the channel number of transducer elements of the sub array SA7 of the second row increases in the +x-axis direction and −y-axis direction, as indicated by T32 to T47. The channel numbers of transducer elements of the sub array SA8 are placed from T48 to T63, in a similar manner.

As described above, the placement of transducer elements of the ultrasound transducer 12 in FIG. 13 is different from the placement of the transducer element described in FIGS. 10A-10D, so that the channel number in the sub array increases in the −y-axis direction and +x-axis direction. Even though the placement is different, the ultrasound beam UB1—ultrasound beam UB4 can be transmitted by changing the driving region of sixty-four transducer elements, as indicated in FIGS. 14A-14D. Also, the ultrasound transducer 12 described in FIGS. 14A-14D can scan the ultrasound beam UB1—ultrasound beam UB4 in the x-axis direction and y-axis direction, similarly with the ultrasound beam of FIGS. 11A-11D and FIGS. 12A-12C.

The Placement of the Ultrasound Transducer

Sixth Embodiment

FIGS. 15A-15D illustrate the sixth embodiment of changing the formation of aperture while maintaining the area of aperture, which is a modified example of the fourth embodiment. Similar to the fifth embodiment, the transducer element 12 described in FIGS. 15A-15D includes eight sub arrays. Transducer elements are placed as indicated below.

The transducer element 12S (S00-S63) of the first group includes four sub arrays (SA1-SA4). The channel number of transducer elements of the sub array SA1 of the first row decreases in the +x-axis direction and −y-axis direction, as indicated by S47 to S32. The channel numbers of transducer elements of the sub array SA2 are placed from S63 to S48 in a similar manner. Similarly, the channel number of transducer elements of the sub array SA3 of the second row decreases in the +x-axis direction and −y-axis direction, as indicated by S15 to S00. The channel numbers of transducer elements of the sub array SA4 are placed from S31 to S16, in a similar manner.

In the transducer element 12T (T00-T63) of the second group, the channel number of transducer elements of the sub array SA5 of the first row decreases in the +x-axis direction and −y-axis direction, as indicated by T15 to T00. The channel numbers of transducer elements of the sub array SA6 are placed from T31 to T16 in a similar manner. Similarly, the channel numbers of transducer elements of the sub array SA7 of the second row decreases in the +x-axis direction and −y-axis direction, as indicated by T47 to T32. The channel numbers of transducer elements of the sub array SA8 are placed from T63 to T48, in a similar manner.

As described above, the placement of transducer elements of the ultrasound transducer 12 in FIGS. 15A-15D is different from the placement of the transducer elements described in FIGS. 10-10D, so that the channel number in the sub array increases to an opposite direction. Even though the placement is different, the ultrasound beam UB1—ultrasound beam UB4 can be transmitted by changing the driving region of sixty-four transducer elements, as indicated in FIGS. 15A-15D. Also, the ultrasound transducer 12 described in FIGS. 15A-15D can scan the ultrasound beam UB1—ultrasound beam UB4 in the x-axis direction and y-axis direction, similarly with the ultrasound beam of FIGS. 11A-11D or FIGS. 12A-12C.

The Equation of the Placement of Ultrasound Transducer

Figure 16:
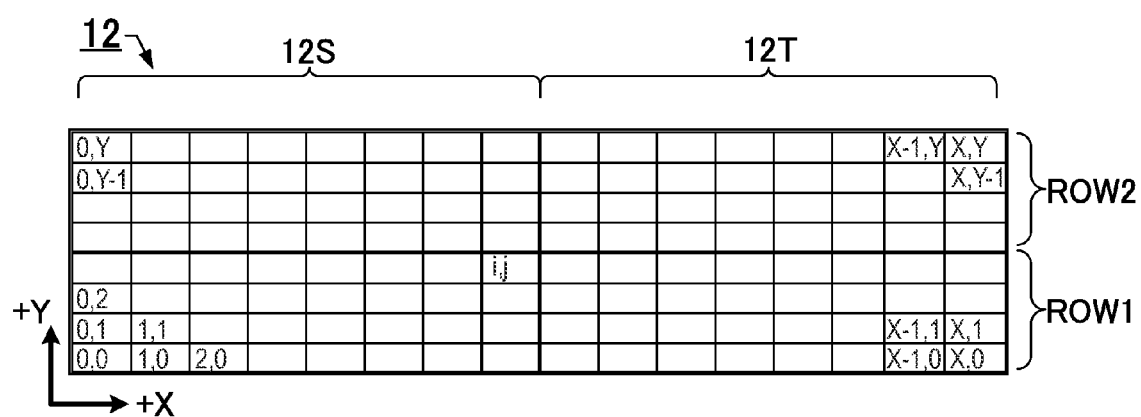
FIG. 16 is an example of changing the formation of aperture at a constant area of aperture in the first and fourth embodiments.

FIG. 16 is an equation of the first embodiment and the fourth embodiment of changing formation of an aperture while maintaining the area of aperture. In the ultrasound transducer 12 of FIG. 16, the placement of the transducer element is indicated as (i, j).

First Embodiment

When the first group of transducer element 12S is given a whole number, sequentially to the channel number of the transducer element (i, j), the channel number of the transducer element of the second group of the transducer element 12T can be described as indicated below.

The channel number of the transducer element (i, j):

when j<Y/2, corresponds to the channel number of transducer element corresponding to ((n−1) K+i, Y/2−j); and when j>Y/2, corresponds to the channel number of transducer element corresponding to ((n−1) K+i, 3Y/2−j).

Wherein, K defines K=Z/Y, the channel number of the multiplexer as Z.

For example, when the number of channel is 64, as shown in FIG. 2, and eight transducer elements are placed in the y-axis direction, as shown in FIGS. 3A-3B, K=8. Also, n is a pole number of one channel. FIGS. 4A-4D was explained using double-pole switch SW (shown in FIG. 2).

Fourth Embodiment

When the first group of transducer element 12S is given a whole number, sequentially to the channel number of the transducer element (i, j), the channel number of the transducer element of the second group of the transducer element 12T can be described as indicated below.

The channel number of the transducer element (i, j);

when j<Y/2, corresponds to the channel number of transducer element corresponding to ((n−1) K+i, Y/2−j); and when j>Y/2, corresponds to the channel number of transducer element corresponding to ((n−1) K+i, −Y/2−j).

Many widely different embodiments of the invention may be configured without departing from the spirit and the scope of the present invention. It should be understood that the present invention is not limited to the specific embodiments described in the specification, except as defined in the appended claims.

What is claimed is:

1. An ultrasound probe connected to an ultrasound diagnostic apparatus configured to transmit an ultrasound beam to a target object, the ultrasound probe comprising:

a switching unit comprising N/2 channels, each channel configured to switch between a first pole and a second pole, wherein N is a natural number;

N/2 first transducer elements connected to the first pole and placed in two-dimensions, wherein a placement is defined in an x-axis direction and a y-axis direction; and N/2 second transducer elements connected to the second pole and placed in two-dimensions, wherein the placement is defined in the x-axis and y-axis directions, wherein a placement of a channel number of the first transducer elements and a placement of a channel number of the second transducer elements differ in the x-axis and y-axis directions, wherein when N transducer elements are selected on the x-axis and N transducer elements are selected on the y-axis, a first square-shaped aperture is formed, wherein when 2N transducer elements are selected on the x-axis and N/2 transducer elements are selected on the y-axis, a second square-shaped aperture different in size than the first square-shaped aperture is formed.

2. The ultrasound probe of claim 1, wherein the first transducer elements and the second transducer elements are divided in the y-axis direction and divided into a first row and a second row, and transducer elements are placed in the first row so that the channel number of the first transducer elements increases in the +y-axis direction and +/−x-axis directions and that the channel number of the second transducer elements increases in the −y-axis direction and +/−x-axis directions.

3. The ultrasound probe of claim 2, wherein the switching unit is configured to scan in the +/−x-axis directions while maintaining a changed formation of an aperture.

4. The ultrasound probe of claim 1, wherein the first transducer elements and the second transducer elements are divided in the y-axis direction and divided into a first row and a second row, and transducer elements are placed so that the channel number of the first transducer elements in the first row increases in the +x-axis direction and +/−y-axis directions and that the channel number of the second transducer elements in the second row increases in the +x-axis and +/−y-axis directions.

5. The ultrasound probe of claim 1, wherein the first transducer elements and the second transducer elements are divided in the y-axis direction and divided into a first row and a second row, and transducer elements are placed so that the channel number of the first transducer elements in the first row increases in the −x-axis direction and +/−y-axis directions and that the channel number of the second transducer elements in the second row increases in the −x-axis direction and +/−y-axis directions.

6. The ultrasound probe of claim 4, wherein the switching unit is configured to scan in the +/−y-axis directions while maintaining a formation of an aperture.

7. The ultrasound probe of claim 5, wherein the switching unit is configured to scan in the +/−y-axis directions while maintaining a formation of an aperture.

8. The ultrasound probe of claim 4, wherein the switching unit is configured to scan in the +/−x-axis directions while maintaining a changed formation of an aperture.

9. The ultrasound probe of claim 5, wherein the switching unit is configured to scan in the +/−x-axis directions while maintaining a changed formation of an aperture.

10. The ultrasound probe of claim 6, wherein the switching unit is configured to scan in the +/−x-axis directions while maintaining changed formation of the aperture.

11. The ultrasound probe of claim 7, wherein the switching unit is configured to scan in the +/−x-axis directions while maintaining changed formation of the aperture.

12. An ultrasound diagnostic apparatus configured to adjust an aperture for transmitting an ultrasound beam to a target object, the ultrasound diagnostic apparatus comprising:
a switching unit comprising N/2 number of channels, each channel configured to switch between a first pole and a second pole, wherein N is a natural number;
an ultrasound probe comprising:
N/2 first transducer elements connected to the first pole and placed in two-dimensions, wherein a placement is defined in an x-axis direction and a y-axis direction: and
N/2 second transducer elements connected to the second pole and placed in two-dimensions; and
a driving signal supply unit configured to supply driving signals to the transducer elements through the switching unit,
wherein the switching unit is configured to switch the N/2 channels, and use the N/2 channels to change a formation of the aperture of the ultrasound beam, wherein the aperture is formed from a combination of the first transducer elements and the second transducer elements such that when N transducer elements are selected on the x-axis and N transducer elements are selected on the y-axis, a first square-shaped aperture is formed, and when 2N transducer elements are selected on the x-axis and N/2 transducer elements are selected on the y-axis, a second square-shaped aperture different in size than the first square-shaped aperture is formed.

13. The ultrasound diagnostic apparatus of claim 8, wherein a channel number of the first transducer elements and a channel number of the second transducer elements differ in the x-axis and y-axis directions.

14. The ultrasound diagnostic apparatus of claim 12, wherein the switching unit is configured to scan in the +/−y-axis directions while maintaining the changed formation of the aperture.

15. The ultrasound diagnostic apparatus of claim 13, wherein the switching unit is configured to scan in the +/−y-axis directions while maintaining the changed formation of the aperture.

16. The ultrasound diagnostic apparatus of claim 12, wherein the switching unit is configured to scan in the +/−x-axis directions while maintaining the changed formation of the aperture.

17. The ultrasound diagnostic apparatus of claim 13, wherein the switching unit is configured to scan in the +/−x-axis directions while maintaining the changed formation of the aperture.

18. The ultrasound diagnostic apparatus of claim 14, wherein the switching unit is configured to scan in the +/−x-axis directions while maintaining the changed formation of the aperture.

19. The ultrasound diagnostic apparatus of claim 15, wherein the switching unit is configured to scan in the +/−x-axis directions while maintaining the changed formation of the aperture.

20. A method of assembling an ultrasonic probe, the method comprising:
providing a switching unit that includes N/2 channels, each channel configured to switch between a first pole and a second pole, wherein N is a natural number;
coupling N/2 first transducer elements to the first pole, the first transducer elements placed in two-dimensions in an x-axis direction and a y-axis direction; and
coupling N/2 second transducer elements to the second pole, the second transducer elements placed in the x-axis and y-axis directions, wherein a placement of a channel number of the first transducer elements and a placement of a channel number of the second transducer elements differ in the x-axis and y-axis directions, wherein when N transducer elements are selected on the x-axis and N transducer elements are selected on the y-axis, a first square-shaped aperture is formed, wherein when 2N transducer elements are selected on the x-axis and N/2 transducer elements are selected on the y-axis, a second square-shaped aperture different in size than the first square-shaped aperture is formed.

* * * * *